US012619104B2

(12) United States Patent
Chiu et al.

(10) Patent No.: US 12,619,104 B2
(45) Date of Patent: May 5, 2026

(54) METHOD OF MANUFACTURING A CONTACT LENS

(71) Applicant: PEGAVISION CORPORATION, Taoyuan City (TW)

(72) Inventors: Hsien-Ting Chiu, Taoyuan City (TW); Yi-Hung Lin, Taoyuan City (TW); Ying-Jhen Huang, Taoyuan City (TW)

(73) Assignee: PEGAVISION CORPORATION, Taoyuan City (TW)

( * ) Notice: Subject to any disclaimer, the term of this patent is extended or adjusted under 35 U.S.C. 154(b) by 210 days.

(21) Appl. No.: 18/516,904

(22) Filed: Nov. 21, 2023

(65) Prior Publication Data

US 2024/0085726 A1     Mar. 14, 2024

Related U.S. Application Data

(62) Division of application No. 17/445,313, filed on Aug. 18, 2021.

(60) Provisional application No. 63/068,383, filed on Aug. 21, 2020.

(51) Int. Cl.
| | |
|---|---|
| G02C 7/10 | (2006.01) |
| G02B 1/04 | (2006.01) |
| G02C 7/04 | (2006.01) |
| B82Y 20/00 | (2011.01) |

(52) U.S. Cl.
CPC ............. *G02C 7/108* (2013.01); *G02B 1/043* (2013.01); *G02C 7/04* (2013.01); *B82Y 20/00* (2013.01)

(58) Field of Classification Search
CPC .......... G02C 7/04; G02C 7/049; G02C 7/108; G02B 1/043
See application file for complete search history.

(56) References Cited

U.S. PATENT DOCUMENTS

| | | | | |
|---|---|---|---|---|
| 3,476,499 | A * | 11/1969 | Wichterle | .............. B29D 11/00 |
| | | | | 351/159.63 |
| 3,957,740 | A * | 5/1976 | Blank | ................... C08K 5/3412 |
| | | | | 264/2.6 |
| 4,669,834 | A | 6/1987 | Richter | |
| 9,433,682 | B2 * | 9/2016 | Mohapatra | .............. A61L 27/52 |
| 9,708,087 | B2 | 7/2017 | Qiu | |
| 10,048,405 | B2 | 8/2018 | Lai | |
| 2001/0032565 | A1 | 10/2001 | Nohr et al. | |
| 2004/0150787 | A1 | 8/2004 | Niculas et al. | |
| 2006/0275596 | A1 | 12/2006 | Payne et al. | |
| 2007/0298242 | A1 | 12/2007 | Huo | |
| 2009/0059165 | A1 * | 3/2009 | Pruitt | .............. B29D 11/00067 |
| | | | | 264/2.6 |

(Continued)

FOREIGN PATENT DOCUMENTS

| | | |
|---|---|---|
| CN | 1419151 A | 5/2003 |
| CN | 109212777 A | 1/2019 |

(Continued)

*Primary Examiner* — Alison L Hindenlang
*Assistant Examiner* — Alexander A Wang
(74) *Attorney, Agent, or Firm* — CKC & Partners Co., LLC

(57) ABSTRACT

A contact lens and a method of manufacturing the same are provided. The contact lens includes a contact lens body and a blue light blocking material. The blue light blocking material covers the contact lens body. The blue light blocking material includes a plurality of metal particles dispersed on the contact lens body. The contact lens has good blue light blocking efficacy and surface properties.

14 Claims, 10 Drawing Sheets

10 providing a contact lens body ~12 immersing the contact lens body with a reaction solution ~14

(56)         References Cited

U.S. PATENT DOCUMENTS

| | | | |
|---|---|---|---|
| 2010/0055454 | A1 | 3/2010 | Tadakuma |
| 2012/0008217 | A1 | 1/2012 | Ishak et al. |
| 2014/0155515 | A1 | 6/2014 | Lai et al. |
| 2015/0138661 | A1 | 5/2015 | Blair et al. |
| 2015/0362757 | A1 | 12/2015 | Fu |
| 2018/0250899 | A1 | 9/2018 | Chien |
| 2018/0267331 | A1 | 9/2018 | Abbasi et al. |
| 2019/0009482 | A1 | 1/2019 | Lai et al. |
| 2020/0174160 | A1* | 6/2020 | Qiu ..................... C09D 143/02 |
| 2020/0308481 | A1 | 10/2020 | Chen et al. |
| 2022/0057653 | A1 | 2/2022 | Chiu et al. |
| 2022/0057655 | A1 | 2/2022 | Chiu et al. |
| 2023/0288728 | A1 | 9/2023 | Mahadevan et al. |

FOREIGN PATENT DOCUMENTS

| | | |
|---|---|---|
| CN | 107045212 B | 11/2019 |
| CN | 213122489 U | 5/2021 |
| CN | 113214586 A | 8/2021 |
| EP | 3173826 A1 | 5/2017 |
| GB | 2202962 A | 10/1988 |
| JP | 2008133535 A | 6/2008 |

* cited by examiner

[Ag]: 45.9 ppm 121°C   [Ag]: 11.6 ppm 121°C   [Ag]: 566.7 ppm 25°C/24 h

Air

Pp container 20-30%

Water steam

Glasses container 55-60%

Water steam

Pp container 45-50%

METHOD OF MANUFACTURING A CONTACT LENS

CROSS-REFERENCE TO RELATED APPLICATION

This application is a Divisional Application of the U.S. application Ser. No. 17/445,313, filed Aug. 18, 2021, which claims priority to U.S. Provisional Application Ser. No. 63/068,383, filed Aug. 21, 2020, all of which are herein incorporated by reference.

BACKGROUND

Field of Invention

The present invention relates to a method of manufacturing a contact lens. More particularly, the present invention relates to a method of manufacturing a contact lens with an ability of blue light blocking.

Description of Related Art

In a recent decade, digital eye strain (DES), also known as computer vision syndrome, is a critical public health challenge. It indicates a serial syndrome of visual disturbance, dryness, or discomfort associated with the prolonged use of digital devices with other directly or indirectly environmental stress on eye. For general contact lens users under such conditions, it is suggested that contact lens with specific wavelength of blue light blocking and enhanced wettability is a promising strategy to alleviate the syndromes.

Especially for elderly people, short wavelength of blue light ranged approximately 400 nm-450 nm result in the higher possibility to photochemical damage due to accumulated lipofuscin constituent A2E pigment, or light-responsive proteins, such as cytochrome oxidase and porphyrin, resulting in age related macular degeneration.

Traditional blue light blocking eye wears are applied through addition of chemical pigment or dye. However, for the higher efficiency of blue light blocking, strong yellow or amber color is usually not desirable in aspect of appearance. Although additionally mixing with the other dyes showing different colors offset the appearance, the efficiency of blue light blocking is therefore decreased. Moreover, the absorption of dyes covering over 500 nm interferes normal color perception and attenuates the overall light transmission and visual efficacy, especially for scotopic vision. These undesired disadvantages in turn may lead to negative influence on the preference of contact lens for general users.

Accordingly, there remains a need to fabricate an ophthalmic device, such as contact lenses, which not only exhibits efficient blue-light blocking with relatively less yellowish appearance, but also enhances surficial hydrophilicity, water retention property along with lubricity of the device.

SUMMARY

In accordance with an aspect of the present disclosure, a contact lens is provided. The contact lens includes a contact lens body and a blue light blocking material. The blue light blocking material covers the contact lens body. The blue light blocking material includes a plurality of metal particles dispersed on the contact lens body.

According to some embodiments of the present disclosure, the plurality of metal particles include silver, gold, cobalt, manganese, nickel, copper, zinc, platinum, palladium, cadmium, indium, potassium, calcium, iron, or combinations thereof.

According to some embodiments of the present disclosure, the contact lens includes about 1 wt % to about 20 wt % of blue light blocking material based on a total weight of the contact lens.

According to some embodiments of the present disclosure, the plurality of metal particles have a diameter of about 1-10000 nm.

According to some embodiments of the present disclosure, the contact lens exhibits tunable plasmonic resonances at visible light ranged from 380-800 nm.

According to some embodiments of the present disclosure, the contact lens inhibits about 5% to about 99% of blue light at wavelength ranged within 380 nm to about 480 nm.

According to some embodiments of the present disclosure, the contact lens has an averaged water contact angle of about 30-70 degrees.

According to some embodiments of the present disclosure, the contact lens has an averaged hysteresis of about 0.1-35 degrees.

According to some embodiments of the present disclosure, the contact lens body includes a hydrogel contact lens or a silicone hydrogel contact lens.

According to some embodiments of the present disclosure, the contact lens body includes carboxyl, amine, hydroxyl, or pyrrolidone structure.

In accordance with another aspect of the present disclosure, a method of manufacturing a contact lens is provided. A contact lens body is provided. The contact lens body is then immersed with a reaction solution to form a contact lens having a blue light blocking material covering the contact lens body. The reaction solution includes a solvent, at least one compound, and at least one reducing agent. The compound includes a metal ion. The reducing agent reduces the metal ion into a metal particle.

According to some embodiments of the present disclosure, the solvent includes water soluble solvent.

According to some embodiments of the present disclosure, the metal ion includes silver ion, gold ion, cobalt ion, manganese ion, nickel ion, copper ion, zinc ion, platinum ion, palladium ion, cadmium ion, indium ion, potassium ion, calcium ion, iron ion, or combinations thereof.

According to some embodiments of the present disclosure, the reducing agent includes at least one functional group including carboxyl group, amine group, thiol group, sulfide group, aldehyde group, hydroxyl group, alkoxide group, N-heterocycle group, pyrrolidone group, borohydride group, or combinations thereof.

According to some embodiments of the present disclosure, the reaction solution further includes at least one hydrophilic-enhanced molecule functionalized with carboxyl group, amine group, thiol group, sulfide group, aldehyde group, hydroxyl group, acrylamide, alkoxide group, N-heterocycle group, pyrrolidone group, ethylene glycol group, or combinations thereof.

According to some embodiments of the present disclosure, the method further includes packaging the contact lens with a package solution, wherein the package solution includes at least one hydrophilic-enhanced molecule; and performing a sterilization process.

According to some embodiments of the present disclosure, the method further includes performing a heating process at a temperature ranged from 25° C. to 135° C. when immersing the contact lens body with the reaction solution.

According to some embodiments of the present disclosure, the heating process includes heating a container accommodated the contact lens body and the reaction solution in an incubator for about 20 minutes to about 24 hours.

According to some embodiments of the present disclosure, the incubator includes an oven, an autoclave sterilizer, or a water bath incubator.

According to some embodiments of the present disclosure, the method further includes preparing a thermal responsive solution at a temperature below a lower critical solution temperature, wherein the thermal responsive solution includes a polymer dissolving in a solvent; immersing the contact lens with the thermal responsive solution; and heating the thermal responsive solution to form at least one hydrophobic moiety on the contact lens body.

According to some embodiments of the present disclosure, the polymer is functionalized with carboxyl group, amine group, thiol group, sulfide group, aldehyde group, hydroxyl group, acrylamide, alkoxide group, N-heterocycle group, pyrrolidone group, ethylene glycol group, or combinations thereof.

According to some embodiments of the present disclosure, the at least one hydrophobic moiety consisting of carbon chain with alkane, alkene, or alkyne bonds.

According to some embodiments of the present disclosure, the carbon chain is a polymer presented in linear or non-linear form including branched or cyclic form.

According to some embodiments of the present disclosure, the method further includes extracting the contact lens with an extraction solution; performing a hydration process with a hydration solution; and performing a sterilization process with a package solution, wherein at least one of the extraction solution, the hydration solution and the package solution includes at least one hydrophilic-enhanced molecule.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
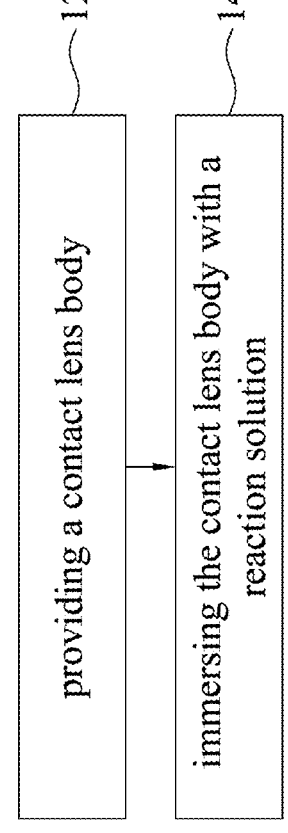
FIG. 1 is a flow chart illustrating a method of manufacturing a contact lens in accordance with some embodiments of this disclosure.

Reference will now be made in detail to the present embodiments of the invention, examples of which are illustrated in the accompanying drawings. Wherever possible, the same reference numbers are used in the drawings and the description to refer to the same or like parts.

In order to make the description of the present disclosure more detailed and complete, the following illustratively describes implementation aspects and specific embodiments of the present disclosure; however, this is not the only form in which the specific embodiments of the present disclosure are implemented or utilized. The embodiments disclosed below may be combined with or substituted by each other in an advantageous manner, and other embodiments may be added to an embodiment without further recording or description. In the following description, numerous specific details will be described in detail to enable readers to fully understand the following embodiments. However, the embodiments of the present disclosure may be practiced without these specific details.

FIG. 1 is a flow chart illustrating a method of manufacturing a contact lens in accordance with some embodiments of this disclosure. As shown in FIG. 1, the method 10 includes operation 12 and operation 14. It is noted that the method depicted in FIG. 1 is merely an example, and is not intended to limit the present invention. Accordingly, additional operations may be performed before, during, and/or after the method depicted in FIG. 1, and some other operations may only be briefly described herein.

Reference is made to FIG. 1. In operation 12 of FIG. 1, a contact lens body is provided. In some embodiments, the contact lens body may be hydrogel contact lens body or silicone hydrogel contact lens body. The contact lens body may be manufactured by suitable method. In some embodiments, the contact lens body includes carboxyl, amine, hydroxyl, or pyrrolidone structure. For example, the contact lens body may have carboxyl group, amine group (e.g., primary, secondary, or tertiary), hydroxyl group, pyrrolidone group, thiol group or combinations thereof. These functional groups on and/or near its surface may be reacted with compounds including a metal ion of the reaction solution subsequently prepared.

Figure 2B:
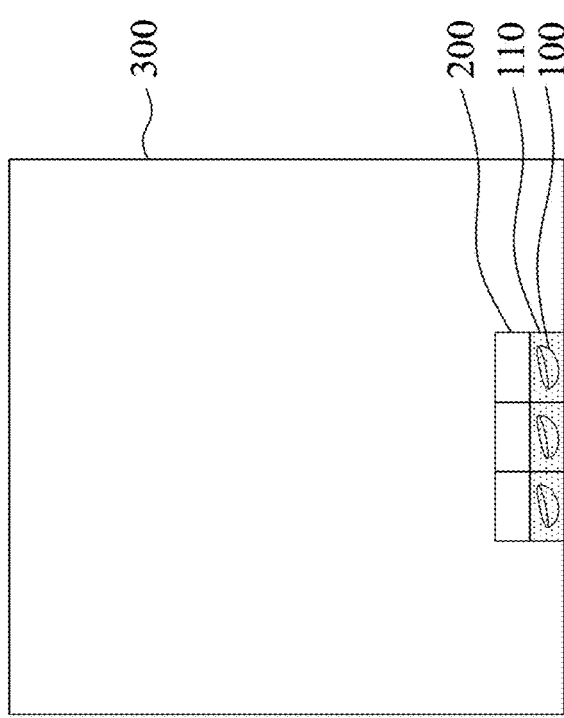
FIG. 2A and FIG. 2B are a diagram illustrating various intermediary stages in the manufacturing of contact lens in accordance with some embodiments of this disclosure.
Figure 2A:
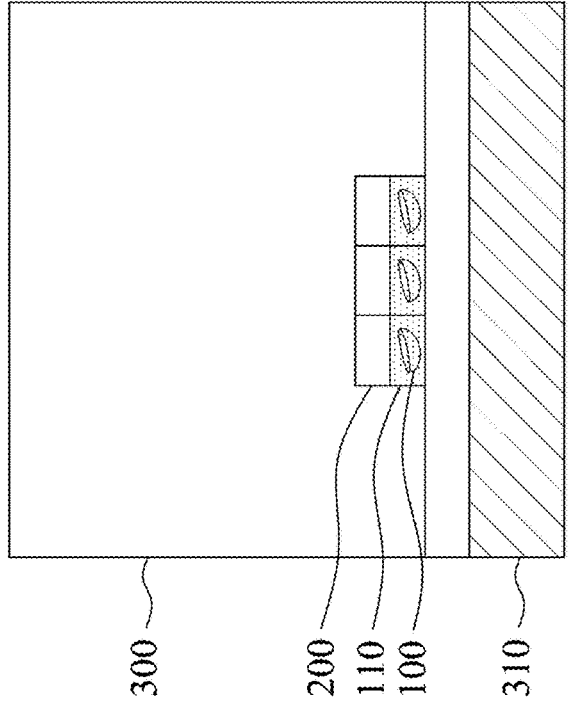

Reference is made to FIG. 1 and FIGS. 2A-2B. In operation 14 of FIG. 1, the contact lens body 100 is immersed with a reaction solution 110 to form a contact lens having a blue light blocking material covering the contact lens body 100. As shown in FIG. 2A and FIG. 2B, the contact lens body 100 and the reaction solution 110 may be placed in a container 200, and the contact lens body 100 is completely soaked in the reaction solution 110. In some embodiments, the container 200 includes polypropylene, or glass.

The reaction solution 110 may include a solvent, at least one compound including a metal ion, and at least one reducing agent for reducing the metal ion into a metal particle. In some embodiments, the solvent includes water soluble solvent. In some examples, the solvent may be DI water.

In some embodiments, the metal ion includes silver ion, gold ion, cobalt ion, manganese ion, nickel ion, copper ion, zinc ion, platinum ion, palladium ion, cadmium ion, indium ion, potassium ion, calcium ion, iron ion, or combinations thereof. In some examples, the compound including metal ion may be silver nitrate.

In some embodiments, the reducing agent includes at least one functional group including carboxyl group, amine group, thiol group, sulfide group, aldehyde group, hydroxyl group, alkoxide group, N-heterocycle group, pyrrolidone group, borohydride group, or combinations thereof. In some examples, a preferred class of reducing agent includes carboxyl-, amino- or thiol containing chemicals. For example, the reducing agent may be poly(acrylamide-co-acrylic acid), trisodium citrate, sodium tetrahydridoborate or combinations thereof. In some embodiments, the reducing agent has a molecular weight between about 37 to about 1000000 Daltons.

In some embodiments, the reaction solution 110 further includes at least one hydrophilic-enhanced molecule, a stabilizing agent, or combinations thereof. In some embodiments, the hydrophilic-enhanced molecule is functionalized with carboxyl group, amine group, thiol group, sulfide group, aldehyde group, hydroxyl group, acrylamide, alkoxide group, N-heterocycle group, pyrrolidone group, ethylene glycol group, or combinations thereof. It is noted that some of the hydrophilic-enhanced molecules, such as poly(acrylic acid), polyvinylpyrrolidone (PVP), hyaluronic acid (HA), mini hyaluronic acid, carboxymethyl cellulose, hydroxypropyl methylcellulose (HPMC) or the like may also have the ability to reduce the metal ion into a metal particle. In some embodiments, the hydrophilic-enhanced molecule may be different from the reducing agent. The addition of the hydrophilic-enhanced molecule can improve blue light blocking efficacy and surface properties of the contact lens.

In some embodiments, the stabilizing agent may be any suitable dispersing agent and/or surfactant. The stabilizing agent may interact with the metal particles. In some embodiments, the stabilizing agent includes ionic, nonionic, zwitterionic surfactant, ammonium salt, sodium salt, the like or combinations thereof.

In some embodiments, the contact lens body 100 is immersed with all of the components of the reaction solution 110 in one step. In other embodiments, each component of the reaction solution 110 may be individually mixed with the contact lens body 100. For example, the contact lens body 100 may be first immersed with a solution including the reducing agent, and the compound including metal ion is then added into the solution. In some embodiments, the contact lens body 100 is immersed in the reaction solution 110 at room temperature for about 30 minutes.

In some embodiments, the method further includes performing a heating process at a temperature ranged from 25° C. to 135° C. when immersing the contact lens body 100 with the reaction solution 110. In some examples, the temperature may be about 25, 30, 35, 40, 45, 50, 55, 60, 65, 70, 75, 80, 85, 90, 95, 100, 105, 110, 115, 120, 125, 130 or 135° C. In some embodiments, the contact lens body 100 is heated at pH from about 3.0 to about 11.0. The container 200 accommodated the contact lens body 100 and the reaction solution 110 may be placed in an incubator 300 for performing the heating process, as illustrated in FIG. 2A and FIG. 2B. In some embodiments, the incubator 300 includes a water bath incubator (e.g., the incubator 300 shown in FIG. 2A includes water 310 therein), an oven (e.g., the incubator 300 shown in FIG. 2B), or an autoclave sterilizer (not shown). In some embodiments, the heating process includes heating the container 200 in the incubator 300 for about 20 minutes to about 24 hours. In some examples, the container 200 may be heated for 20 minutes, 0.5, 1, 2, 3, 4, 5, 6, 7, 8, 9, 10, 11, 12, 13, 14, 15, 16, 17, 18, 19, 20, 21, 22, 23 or 24 hours. The Heating process can speed up the modification of the blue light blocking materials covering the contact lens body 100.

In some embodiments, the method further includes preparing a thermal responsive solution at a temperature below a lower critical solution temperature (LCST); immersing the contact lens with the thermal responsive solution; and heating the thermal responsive solution heating the thermal responsive solution to form at least one hydrophobic moiety on the contact lens body.

In some embodiments, the thermal responsive solution includes a polymer dissolving in a solvent. In some embodiments, the polymer is functionalized with carboxyl group, amine group, thiol group, sulfide group, aldehyde group, hydroxyl group, acrylamide, alkoxide group, N-heterocycle group, pyrrolidone group, ethylene glycol group, or combinations thereof. In some examples, the polymer may be hyaluronic acid (HA), mini hyaluronic acid (mini HA), hydroxypropyl methylcellulose (HPMC) and carboxymethyl cellulose (CMC), polyvinylpyrrolidone (PVP). In some embodiments, the solvent includes DI water.

In some embodiments, the thermal responsive solution is heated to reach or over the point of LCST. Specifically, hydrophobic moieties of the polymer are revealed after heating the thermal responsive solution, thereby a relatively hydrophobic surface on and/or near contact lens body is created. The hydrophobic surface may lead the contact lens unable to show completed water film. In some embodiments, the at least one hydrophobic moiety consisting of carbon chain with alkane, alkene or alkyne bonds. In some embodiments, the carbon chain is a polymer presented in linear or non-linear form including branched or cyclic form. The hydrophobic moiety on the contact lens body may be bonded to the hydrophobic moiety of the hydrophilic-enhanced molecule of a solution used in any of the subsequent extraction, hydration, and/or sterilization processes, such that the hydrophilic moiety of the hydrophilic-enhanced molecule is exposed, and the surface of contact lens body exhibits hydrophilic. Therefore, the surface hydrophilic, wettability and/or lubricity properties of the contact lens may be improved. In some embodiments, the method further includes extracting the contact lens with an extraction solution. The extraction process may be performed after immersing the contact lens body with the reaction solution and/or immersing the contact lens with the thermal responsive solution.

In some embodiments, when the contact lens body is silicone hydrogel contact lens, the extraction solution may be isopropanol and 50% v/v isopropanol. In other embodiments, when the contact lens body is hydrogel contact lens, the extraction solution may be borate buffered saline. In some embodiments the extraction solution further includes at least one hydrophilic-enhanced molecule. In some embodiments, the hydrophilic-enhanced molecule includes at least one functional group including carboxyl group, amine group, thiol group, sulfide group, aldehyde group, hydroxyl group, alkoxide group, N-heterocycle group, pyrrolidone group, borohydride group, or combinations thereof. In some examples, a preferred class of hydrophilic-enhanced molecule includes carboxyl-, amino- or thiol containing chemicals. In some examples, the hydrophilic-enhanced molecule may be poly(acrylamide-co-acrylic acid), poly (acrylic acid), polyvinylpyrrolidone (PVP), hyaluronic acid (HA), mini hyaluronic acid (mini HA), carboxymethyl cellulose (CMC), hydroxypropyl methylcellulose (HPMC), surfactant, or combinations thereof. In some embodiments, the hydrophilic-enhanced molecule may be same as the polymer of the thermal responsive solution. In some embodiments, the hydrophilic-enhanced molecule may be different from the polymer of the thermal responsive solution.

The method further includes performing a hydration process. In some embodiments, the contact lens is hydrated by a hydration solution such as borate buffered saline. In some embodiments, the hydration solution may further includes the hydrophilic-enhanced molecule described above. In some embodiments, the hydrophilic-enhanced molecule may be same as the polymer of the thermal responsive solution. In some embodiments, the hydrophilic-enhanced molecule may be different from the polymer of the thermal responsive solution. The hydrophilic-enhanced molecule may have LCST property.

The method further includes performing a sterilization process. In some embodiments, the contact lens is packaged with a package solution before performing the sterilization process. In some embodiments, the package solution includes borate buffer saline. In some embodiments, the package solution further includes at least one hydrophilic-enhanced molecule, such as hyaluronic acid, mini hyaluronic acid, carboxymethyl cellulose, hydroxypropyl methylcellulose, surfactant, or combinations thereof. In some embodiments, the hydrophilic-enhanced molecule may be same as the polymer of the thermal responsive solution. In some embodiments, the hydrophilic-enhanced molecule may be different from the polymer of the thermal responsive solution. In some embodiments, the contact lens is sterilized at about 121° C. for about 20 minutes.

Another aspect of the present invention provides a contact lens. The contact lens includes a contact lens body and a blue light blocking material covering the contact lens body, in which the blue light blocking material includes a plurality of metal particles dispersed on the contact lens body.

In some embodiments, the contact lens body includes a hydrogel contact lens or a silicone hydrogel contact lens. In some embodiments, the contact lens body includes carboxyl, amine, hydroxyl, or pyrrolidone structure. For example, the contact lens body may have carboxyl group, amine group (e.g., primary, secondary, or tertiary), hydroxyl group, pyrrolidone group, thiol group or combination thereof.

In some embodiments, the plurality of metal particles comprise silver, gold, cobalt, manganese, nickel, copper, zinc, platinum, palladium, cadmium, indium, potassium, calcium, iron, or combinations thereof. In some embodiments, the plurality of metal particles have a diameter of about 1-10000 nm. In some embodiments, the diameter of the metal particle preferably from 1 to 1000 nm, or more preferably from 1 to 200 nm. In some embodiments, the metal particle may be particles separated from each other, cluster or combinations thereof. In some embodiments, the metal particles are substantially uniformly spread out the contact lens body. In some embodiments, the contact lens includes about 1 wt % to about 20 wt % blue light blocking material based on a total weight of the contact lens. With only a few amount of the blue light blocking material, the contact lens of this invention can achieve good blue light blocking efficiency.

In some embodiments, the contact lens exhibits tunable plasmonic resonances at visible light ranged from 380-800 nm. In some embodiments, the contact lens exhibits tunable plasmonic resonances at visible light ranged preferably from 380-500 nm. In some embodiments, the contact lens exhibits tunable plasmonic resonances at visible light ranged more preferably from 380-450 nm. In some embodiments, the contact lens inhibits about 5% to about 99% of blue light at wavelength ranged within 380 nm to about 480 nm while the efficacy for light blocking at 480-800 nm is 14%-98%. In some embodiments, the contact lens has an averaged water contact angle of about 30-70 degrees. In some embodiments, the contact lens has an averaged hysteresis of about 0.1-35 degrees.

Example 1: Preparation of a Hydrogel Contact Lens 2-hydroxyethyl methacrylate (HEMA) and methacrylic acid were mixed with cross-linkers ethyleneglycol dimethacrylate and trihydroxymethylpropyl trimethylacrylate to form a mixture. The mixture was used to dissolve the rest of powders including reactive blue dye, Bis(2,4,6-trimethyl-benzoyl)-phenylphosphineoxide (IRGACURE 819) and 2-[2-Hydroxy-5-[2-(methacryloyloxy)ethyl]phenyl]-2H-benzotriazole under a magnetic stir bar stirring until all the powders were dissolved in the mixture.

The as-prepared reaction mixture was added and cast into front- and back-curve molds made from polypropylene and irradiated at 5 mW/cm$^2$ for 20 minutes in air. The resultant hydrogel contact lens in dry state was released and then extracted by borate buffered saline twice under 60° C. for 1 hour. The resultant hydrogel contact lens was placed in blister package filled with borate buffered saline and sterilized. The resultant hydrogel contact lens had a water content of about 58%, oxygen permeability of about 20-25 DK, modulus of about 0.3-0.4, and blue-light blocking efficacy of about 1-3%.

Example 2: Preparation of a Silicone Hydrogel Contact Lens

Hydrophilic component of N-vinyl pyrrolidone (NVP), 2-hydroxyethyl methacrylate (HEMA), methacrylic acid and N,N-dimethylanilline (DMA) were first mixed with silicone material (3-Methacryloxy-2-hydroxypropoxy)propylbis (trimethylsiloxy)methylsilane, and then mixed with cross-linkers ethyleneglycol dimethacrylate and triallyl-s-triazine-2,4,6(1H.3H,5H)-trione. Finally, the mixture was used to dissolve the rest of powders including reactive blue dye, Bis(2,4,6-trimethylbenzoyl)-phenylphosphineoxide (IRGACURE 819) and 2-[2-hydroxy-5-[2-(methacryloyloxy)ethyl]phenyl]-2H-benzotriazole under a magnetic stir bar stirring until all the powders were dissolved in the mixture.

The as-prepared reaction mixture was added and cast into front- and back-curve molds made from polypropylene and irradiated at 5 mW/cm$^2$ for 30 minutes in air. The resultant silicone hydrogel contact lens in dry state was released. Subsequently, the dry silicone hydrogel contact lenses were extracted with isopropanol and 50% v/v isopropanol under 50° C. for 1 hour, respectively and then washed with borate buffered saline twice under 25° C. for 10 minutes. The hydrated silicone hydrogel contact lens was placed in blister package filled with borate buffered saline and sterilized. The resultant silicone hydrogel contact lens had a water content of about 48-52%, oxygen permeability of about 120 DK, modulus of about 0.6-0.7, and blue-light blocking efficacy of about 5-7%.

To further understand the detail of the reaction between contact lens and blue light blocking materials, the same reaction mixture was prepared except for replacing methacrylic acid with the same amount of 2-hydroxyethyl methacrylate. The subsequent manufacturing process was same as described above. The resultant silicone hydrogel contact lens without methacrylic acid addition showed a water content of about 46-50%, oxygen permeability of about 120 DK, modulus of about 0.6-0.7 and blue-light blocking efficacy of about 8-10%.

Example 3

Figures 5A, 5B:
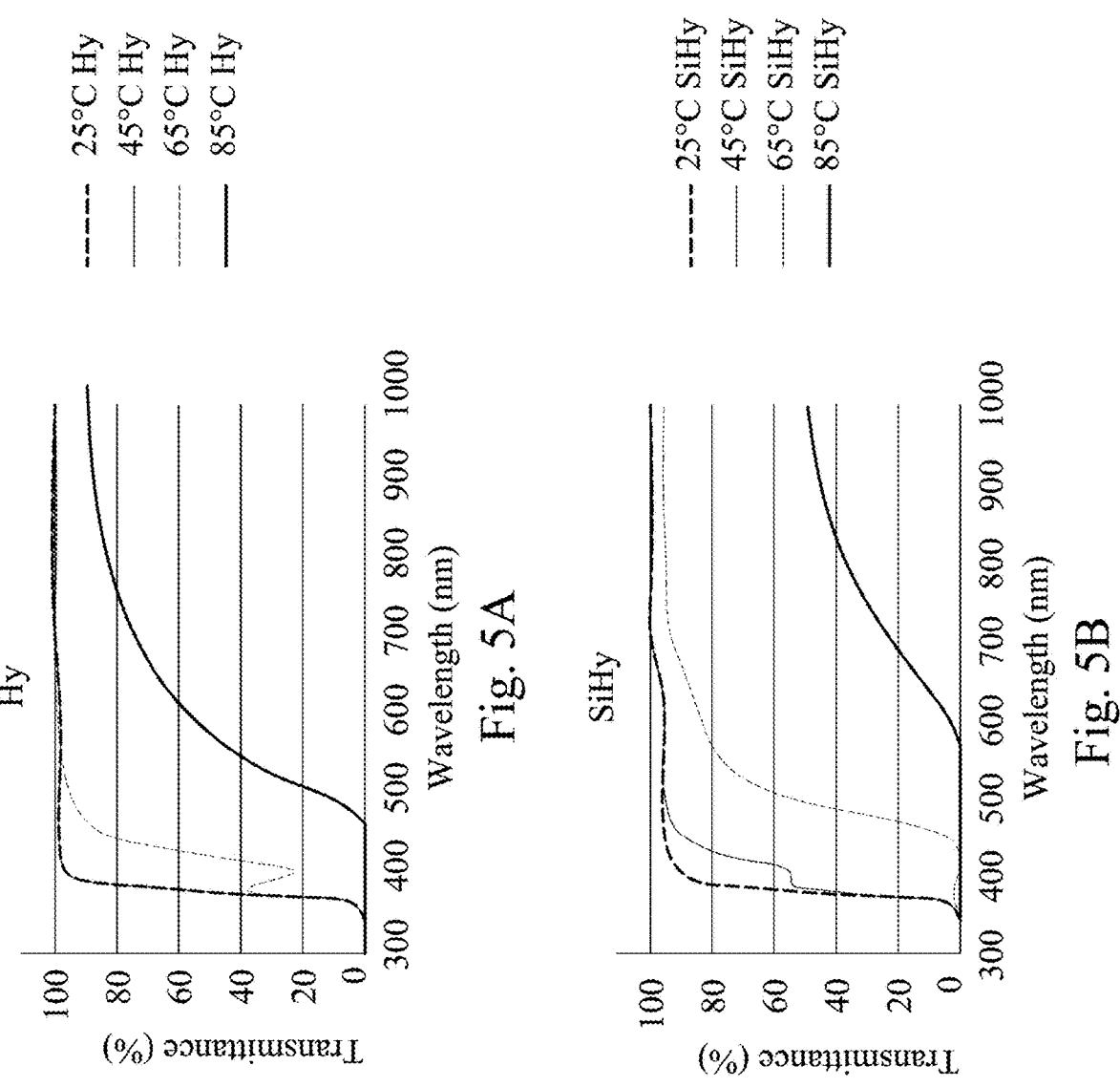
FIG. 5A and FIG. 5B respectively shows the UV-Vis spectrum of silicone hydrogel contact lenses and hydrogel contact lenses in accordance with some embodiments of this disclosure.

A stock solution was prepared through DI water to dissolve the powders of poly(acrylamide-co-acrylic acid) and trisodium citrate, which the final concentration was 0.5 mg/ml and 0.1 M, respectively. 600 µL of the stock solution was increased, the enhanced blue-light blocking efficacy of the resultant contact lens was observed (i.e., the color of the contact lens was darker). Moreover, by calculating the UV-Vis spectra profile at 380-480 nm shown in FIGS. 5A and 5B, as compared to hydrogel contact lens (FIG. 5A), silicone hydrogel contact lens (FIG. 5B) was more reactive to the blue-light blocking materials under the same conditions. The corresponding blue light blocking efficacy of resultant silicone hydrogel contact lens achieved about 8% to about 100% of blue-light blocking efficacy. This was due to the silicone hydrogel contact lens had the higher portion of effective functional groups, such as carboxyl group and pyrrolidone group.

TABLE 1

| | | Incubation condition | | | | | |
|---|---|---|---|---|---|---|---|
| Types of Contact Lens | Silver nitrate (ppm) | 25° C. for 2 h | 45° C. for 2 h | 65° C. for 2 h | 85° C. for 2 h | 25° C. for 24 h | 121° C. for averaged 20 min |
| SiHy | 566.7 | X | O | O | O | O | O |
| | 45.9 | X | X | O | O | X | O |
| | 11.6 | X | X | X | O | X | O |
| Hy | 566.7 | X | X | O | O | X | O |
| | 45.9 | X | X | X | O | X | O |
| | 11.6 | X | X | X | O | X | O | was added in a container made from polypropylene. Then, the dry-released of silicone hydrogel contact lens or hydrogel contact lens (i.e., contact lens body) was placed into the container and immersed into the stock solution. 300 µL of 20 mM, 1.62 mM and 0.41 mM silver nitrate solution was added into the container and mixed with the stock solution. After about 5 minutes, to ensure the mixture to submerge the contact lens, 900 µL of DI water was added into the container. The resultant mixture (i.e. reaction solution) was transparent. The final concentration of silver nitrate for three reaction mixture was about 566.7 ppm, 45.9 ppm, and 11.6 ppm, respectively.

Next, silicone hydrogel contact lens or hydrogel contact lens in the container was then incubated with the reaction solution for 30 minutes at room temperature. Then, the container was heated in an oven for 2 hours with a ranged of temperature from 25° C. to 85° C. After that, contact lenses were washed with DI water twice to remove unreacted reaction solution. After the incubation process, the silicone hydrogel contact was respectively extracted by isopropanol and 50% v/v isopropanol under 50° C. for 1 hour and then hydrated by borate buffered saline twice under 25° C. for 10 minutes. As for hydrogel contact lens, it was then extracted by borate buffered saline twice under 60° C. for 1 hour. All the contact lenses were finally placed into borate buffered saline before any further experiments.

The reactions under various conditions were summarized in Table 1. In Table 1, SiHy represented silicone hydrogel contact lens, and Hy represented Hydrogel contact lens. The label X represented the efficacy of 380-480 nm blue-light blocking was less than 10%, and the label O represented the efficacy of 380-480 nm blue-light blocking was more than 10%.

Figure 3:
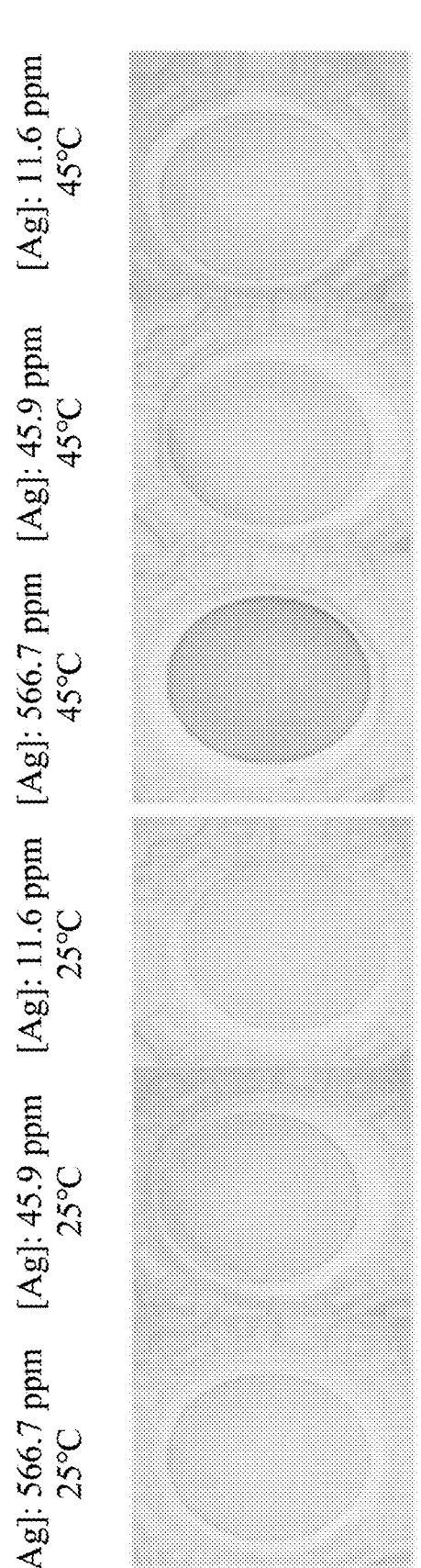
FIG. 3 and FIG. 4 are digital images of contact lens in accordance with some embodiments of this disclosure.
Figure 3:
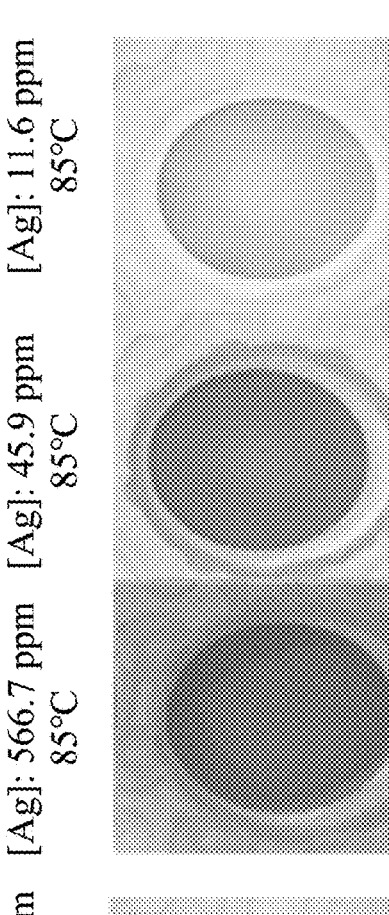
Figure 3:
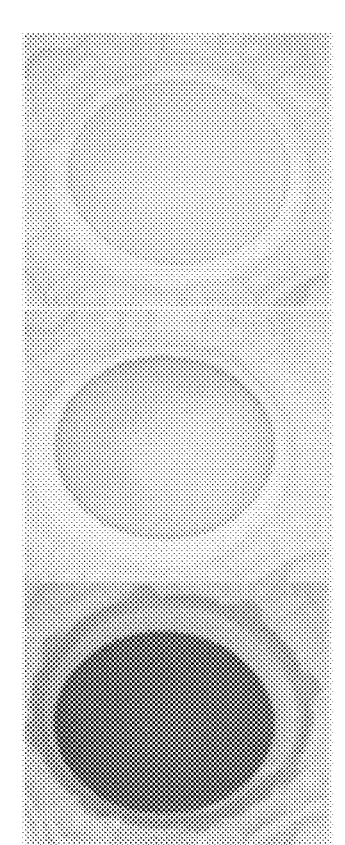
Figure 4:
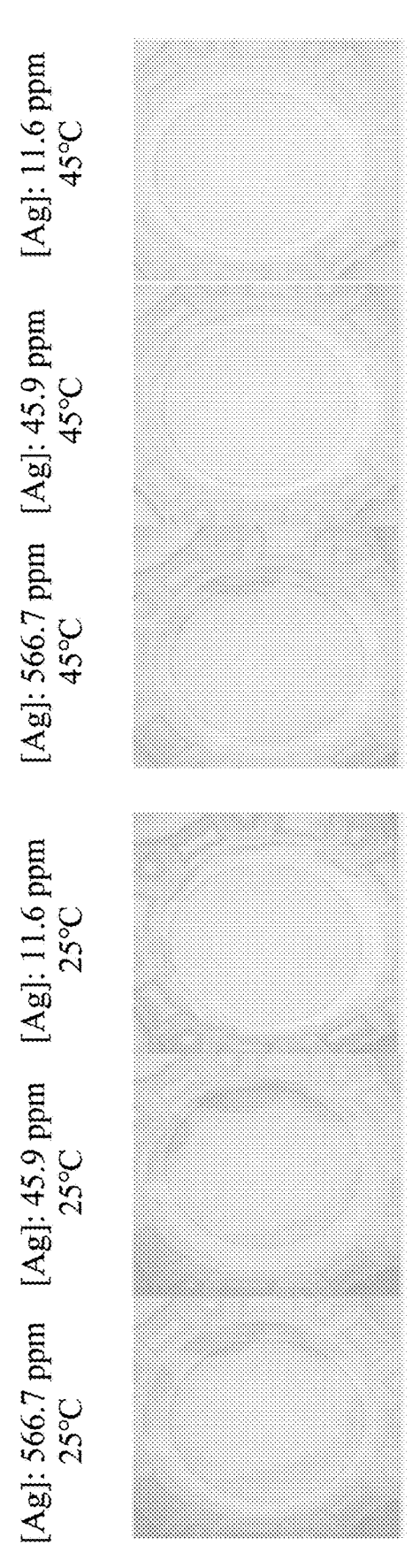
Figure 4:
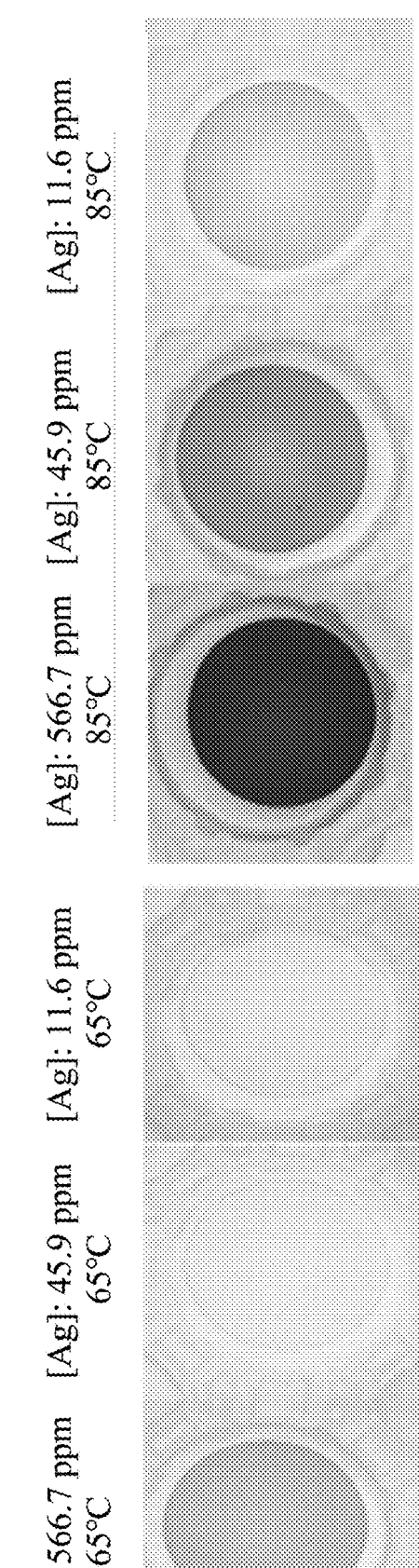

As shown in Table 1. The final contact lens showed that the reaction of dispersing blue light blocking material on contact lens body was positively temperature-dependent. FIG. 3 and FIG. 4 are respectively digital images of silicone hydrogel contact lenses and hydrogel contact lenses. As shown in FIG. 3 and FIG. 4, when the incubated temperature

Example 4

By following the same protocol as described in Examples 1 and 2, dried silicone hydrogel contact lens (with or without methacrylic acid component) and hydrogel contact lenses were immersed in the reaction solution for 30 minutes. After that, the contact lenses were continued to soak in the reaction solution for additional 24 hours at room temperature or sealed in a glass container for averaged 20-minute sterilization at 121° C. The contact lenses were finally placed into borate buffered saline before any further experiments.

Figure 6A:
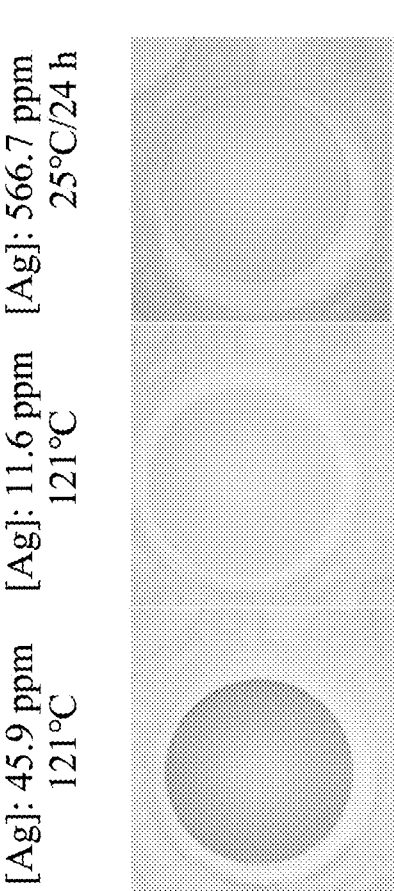
FIGS. 6A-6C are digital images of contact lens in accordance with some embodiments of this disclosure.
Figure 6B:
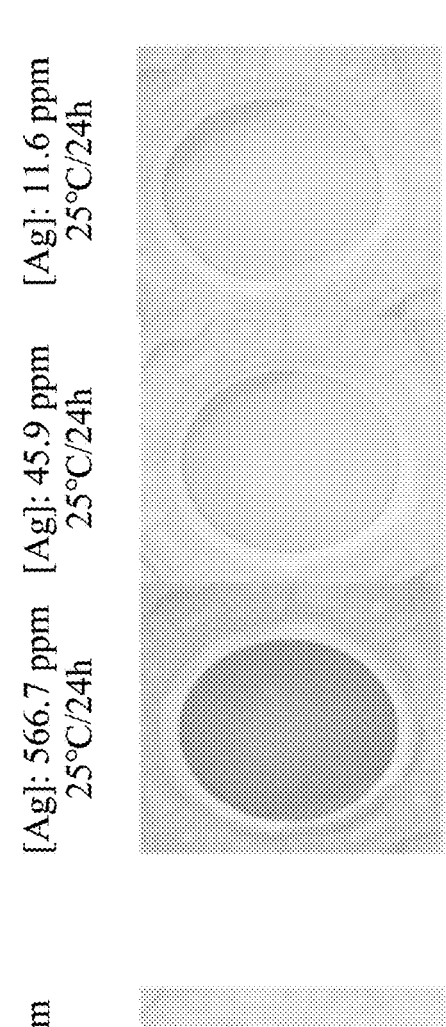
Figure 6B:
Figure 6C:
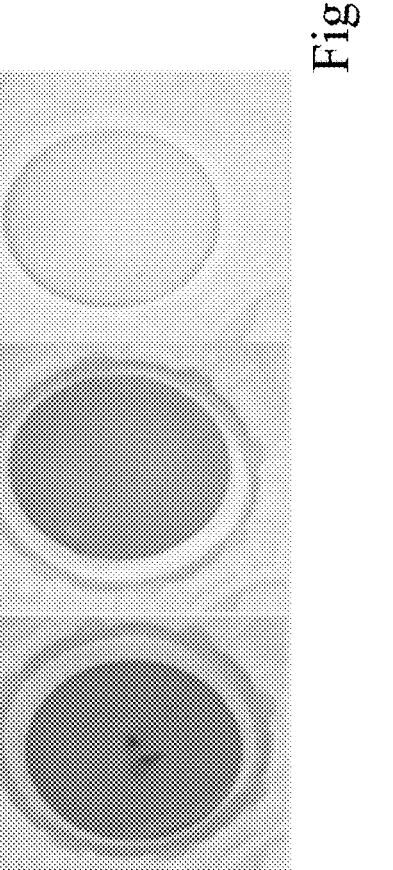
Figure 6C:
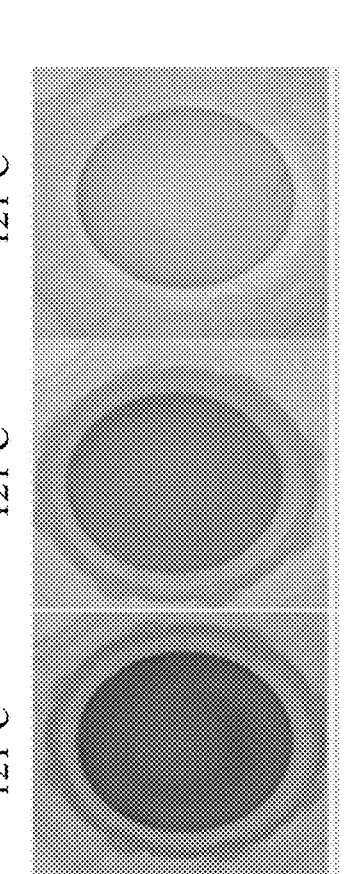

The results were shown in Table 1 and FIGS. 6A-6C. Silicone hydrogel contact lenses without methacrylic acid component were barely reactive in sterilization, as shown in FIG. 6A. Silicone hydrogel contact lenses (SiHy) with methacrylic acid component were reactive in both 24 h room-temperature incubation and sterilization at 121° C., as shown in FIG. 6B. On the other hand, hydrogel contact lens (Hy) were reacted with the reaction solution only when proceeding by sterilization, as shown in FIG. 6C.

As evidenced by the results in Examples 1 and 2, data in the example strengthens the conclusion illustrating that silicone hydrogel contact lens with possessing more functional groups (e.g., pyrrolidone group, and methacrylic acid group) exhibited more efficient in blue light blocking than silicone hydrogel contact lens without methacrylic acid addition or hydrogel contact lens.

Example 5

By following the protocols of reaction solution and the schematic illustration of fabrication as described in Examples 1 and 2, a series of experiments was carried out to investigate the effect of poly(acrylamide-co-acrylic acid) and trisodium citrate in blue light blocking material modification on silicone hydrogel contact lens. All the resultant contact lenses were transferred to borate buffered saline prior to any other examinations.

Figure 7B:
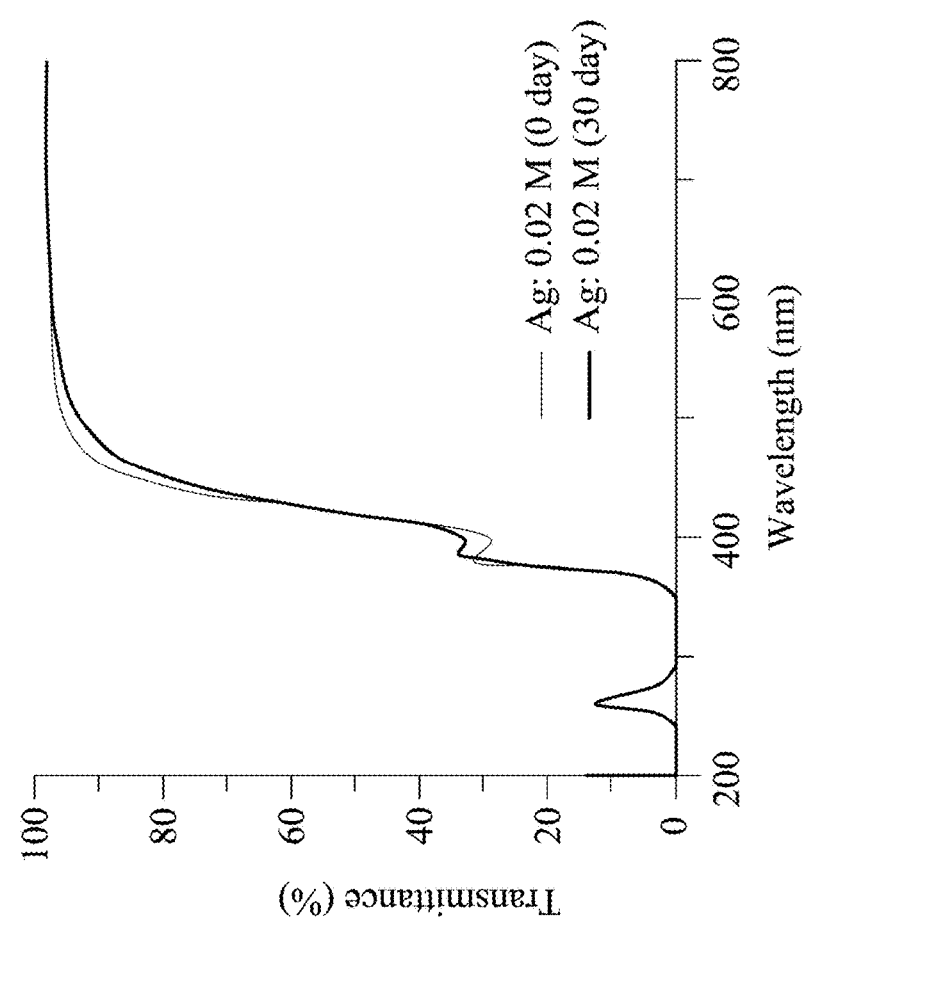
FIG. 7B shows the UV-Vis transmission spectrum of a silicone hydrogel contact lens/a hydrogel contact lens in accordance with some embodiments of this disclosure.
Figure 7A:
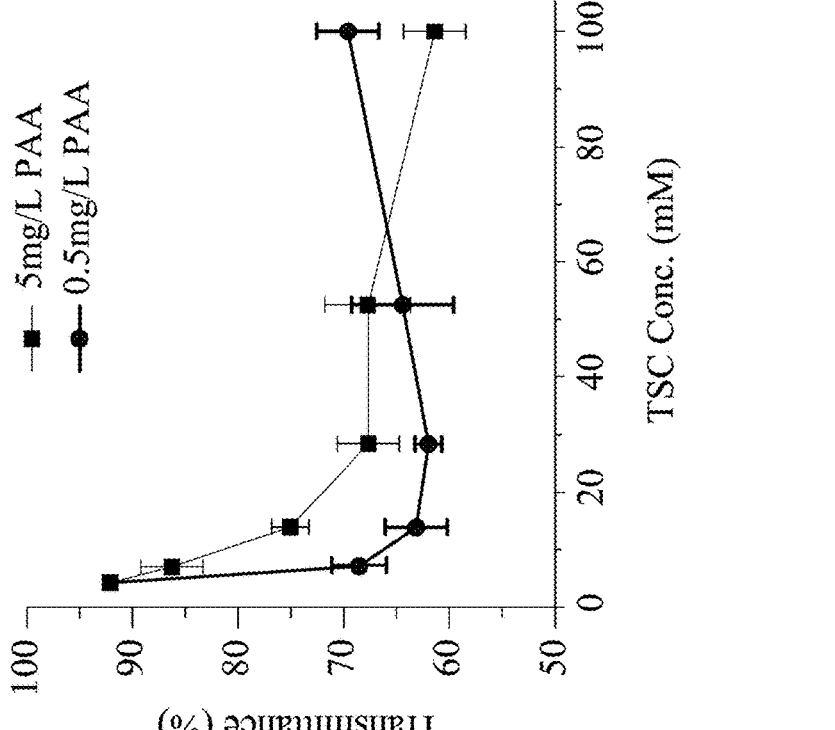
FIG. 7A shows blue light transmittance of contact lens in accordance with some embodiments of this disclosure.

The experimental conditions and results were shown in Table 2 and FIGS. 7A-7B. In Table 2, PAA represented poly(acrylamide-co-acrylic acid), and TSC was the abbreviation of trisodium citrate. Blue light blocking referred to the Blue light blocking efficacy at wavelength of 380-480 nm.

In addition, the stability of resultant contact lens fabricated by #6 was further tested by additional incubation of the contact lens at 50° C. for 1 month, which was shown in #7. FIG. 7B showed the UV-Vis transmission spectrum of contact lenses #6 and #7. As compared to the result in #6, neither the UV-Vis absorption profile, nor the corresponding blue-light blocking efficacy was significantly altered.

TABLE 2

| No. | PAA (mM) | TSC (mM) | Blue light blocking (%) |
|-----|----------|----------|-------------------------|
| #1 | 0 | 0 | <5% |
| #2 | 0.5 | 2.5 | 13.7% |
| #3 | 0.5 | 10 | 25.0% |
| #4 | 0.5 | 25 | 32.2% |
| #5 | 0.5 | 50 | 32.0% |
| #6 | 0.5 | 100 | 37.2% |
| #7 | 0.5 | 100 | 37.8% |
| #8 | 5 | 0 | 14.0% |
| #9 | 5 | 2.5 | 32.3% |
| #10 | 5 | 10 | 35.0% |
| #11 | 5 | 25 | 37.9% |
| #12 | 5 | 50 | 32.5% |
| #13 | 5 | 100 | 31.5% |

Example 6

96 ml of stock solution was first prepared by using DI water to dissolve two powders of poly(acrylamide-co-acrylic acid) and trisodium citrate under a magnetic stir bar at room temperature for 1 hour. The final concentration of poly(acrylamide-co-acrylic acid) and trisodium citrate was 0.5 mg/ml and 0.1 M respectively. Then, 176 ml of DI water and 16 ml of silver nitrate solution were then added into the stock solution under stirring for another 1 hour to form a reaction solution. The final concentration of silver nitrate was 15 ppm.

Each container was added by 1.8 ml of the reaction solution. Each container was then loaded with one hydrogel contact lens, which was immersed in the reaction solution. All containers were then divided into two groups, as illustrate in FIG. 2A and FIG. 2B. One group was placed in a water bath for water steam shown in FIG. 2A. Other group was incubated in an oven shown in FIG. 2B. Both of the incubation conditions were controlled at 85° C. for 2 hour.

Figure 8:
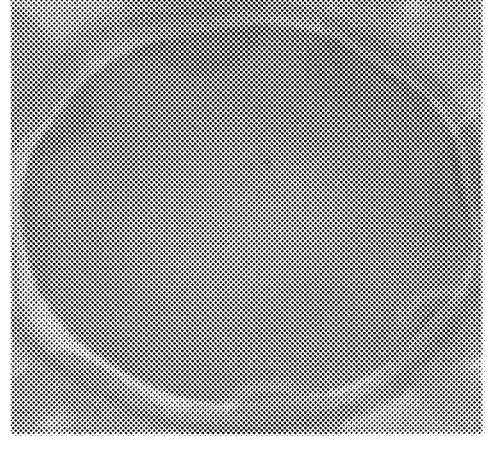
FIG. 8 to FIG. 9 are digital images of contact lens in accordance with some embodiments of this disclosure.
Figure 8:
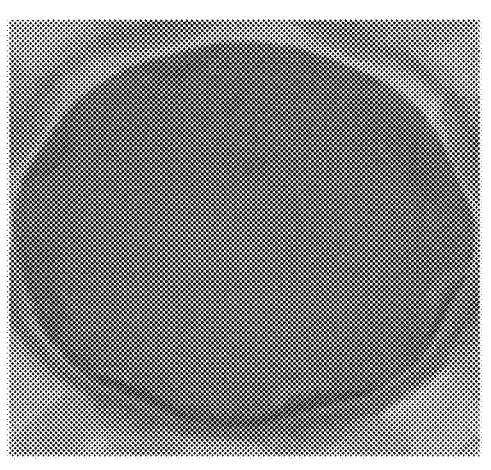
Figure 8:
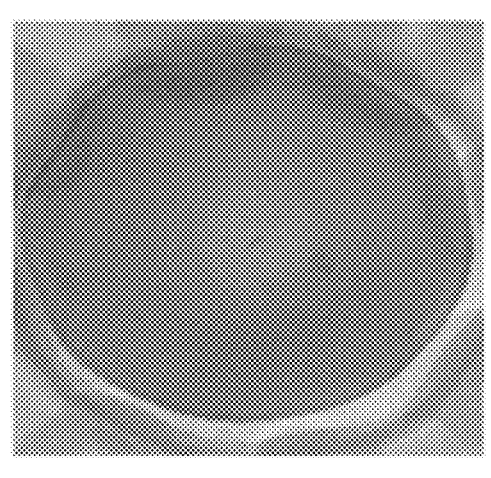

The results were shown in FIG. 8. From FIG. 8, it can be seen that contact lens incubated in a dry oven was not efficient for blue-light blocking material modifications, which the blue light blocking efficacy was about 25% and the color the contact lens was lightest. On the other hand, those containers incubated in water bath for water steam exhibited about 45% efficiency of blue light blocking. When the container made by polypropylene was replaced with glass material that was helpful for heat transduction, about 10% increase of blue-light blocking efficacy was observed. After extraction, hydration and sterilization, contact lenses with reaction in water steam exhibited about 15% of blue light blocking efficacy. Since the results in Example 3 had proved that modification of blue-light blocking material on contact lens was temperature-dependent, heat transduction believed to be more efficient in water steam than that in air explains the results in Example 6, suggesting water steam developed by water bath for temperature-dependent reaction was relatively more efficient than that in dry oven. Accordingly, all the following experiments were all applied through water steam.

Example 7

A series of experiments were exanimated to study the blue-light blocking material reaction on hydrogel contact lens once the initial component, poly(acrylamide-co-acrylic acid) was removed or additional supplementary material was added. For preparing a serial reaction solution for comparison, experiments in #14, #15, #18 and #19 were prepared with a method similar to Example 6. As to experiments in #16-#17 and #20-#24, 96 ml of the mixture containing poly(acrylamide-co-acrylic acid) and trisodium citrate was first prepared. 128 ml of DI water and 16 ml of silver nitrate solution were then added into the mixture under stirring for another 5 minutes. Finally, another material with 48 ml of 31.3 μM PA (poly(acrylic acid)), 0.1 wt % PVP (polyvinylpyrrolidone, 29000 Daltons), 0.1 wt % HA (hyaluronic acid), 0.1 wt % mini HA (mini hyaluronic acid), or 0.5 wt % CMC (carboxymethyl cellulose) was selectively added in the mixture under stirring for another 20 minutes. The final concentration of silver nitrate was 15 ppm.

Each of the containers was placed with one dried hydrogel contact lens. Then, 1.8 ml of as-prepared reaction solution was added into the containers for 30 minutes. All of the containers were then incubated in water steam at 85° C. for 2 hour. After incubation, all of the contact lenses were placed into new containers loaded with 2 ml of fresh DI water. All the samples were recorded through digital camera, and the resultant images were analyzed through processing by an attachment of a palette from computer program or Image J software. The effect of poly(acrylamide-co-acrylic acid) or other additional supplementary material was shown in Table 3.

In Table 3, PAA represented poly(acrylamide-co-acrylic acid); PA represented poly(acrylic acid) with molecular weight about 2000 Daltons; TSC represented trisodium citrate; PVP represented polyvinylpyrrolidone; HA represented hyaluronic acid with molecular weight about 1000000 Daltons; Mini HA represented Mini hyaluronic acid with molecular weight less than about 10000 Daltons; CMC represented carboxymethyl cellulose with molecular weight about 250000 Daltons; and CL referred to contact lens. The label * indicates that the coverage of blue light blocking material was heterogeneously distributed on the contact lens. Color change ($\Delta C$): Color yellow (255, 255, 0) was served as the control group for further comparisons.

TABLE 3

| No. | PAA (mM) | PA (μM) | TSC (mM) | PVP (wt %) | HA (wt %) | Mini HA (wt %) | CMC (wt %) | CL color (RGB) | Color change (ΔC) |
|---|---|---|---|---|---|---|---|---|---|
| #14 | 0 | 0 | 25 | 0 | 0 | 0 | 0 | (243, 255, 235) | 335 |
| #15 | 0 | 0 | 100 | 0 | 0 | 0 | 0 | (248, 253, 253) | 361 |
| #16 | 0 | 31.3 | 25 | 0 | 0 | 0 | 0 | (250, 250, 190) | 270 |
| #17 | 0.125 | 31.3 | 25 | 0 | 0 | 0 | 0 | (255, 244, 139)* | 197 |
| #18 | 0.125 | 0 | 25 | 0 | 0 | 0 | 0 | (255, 234, 143) | 202 |
| #19 | 0.5 | 0 | 25 | 0 | 0 | 0 | 0 | (255, 245, 167) | 236 |
| #20 | 0.75 | 0 | 25 | 0 | 0 | 0 | 0 | (250, 240, 171) | 242 |
| #21 | 0.125 | 0 | 25 | 0.1 | 0 | 0 | 0 | (247, 239, 141) | 201 |
| #22 | 0.125 | 0 | 25 | 0 | 0.1 | 0 | 0 | (246, 243, 164) | 234 |
| #23 | 0.125 | 0 | 25 | 0 | 0 | 0.1 | 0 | (249, 244, 175) | 250 |
| #24 | 0.125 | 0 | 25 | 0 | 0 | 0 | 0.5 | (252, 249, 216) | 307 |

Example 8

As illustrated in Example 8, additional solution containing functional chemicals, such as hyaluronic acid (HA), mini hyaluronic acid (mini HA), carboxymethyl cellulose (CMC), and hydroxypropyl methylcellulose (HPMC) were further modulated for blue-light blocking material modification. These functional chemicals were helpful on the improvement of surface properties of medical device. Accordingly, to maximum the improvement of surface properties and balance the efficacy of blue-light blocking, those functional chemicals working in the process of hydration, sterilization or combinations thereof were tested under a series of examinations.

Contact lenses were first prepared according to the method described in #21 (Example 7). After 2 hours of blue-light blocking material modification, contact lenses were washed with DI water twice and incubated in a solution, which was alternatively DI water, 0.1 wt % HA, 0.1 wt % mini HA, 0.5 wt % CMC, 0.3 wt % HPMC (hydroxypropyl methylcellulose, 80-120 cp), or 0.1 wt % HPMC (hydroxypropyl methylcellulose, 2600-5600 cp) at 85° C. by water bath heating for additional 1 hour. Then, contact lenses were hydrated in borate buffer saline at 60° C. for 0.5 hour three times. Finally, contact lenses were packaged in the glass container with 3 ml of package solution, which was optionally borate buffer saline, 0.1 wt % hyaluronic acid, 0.1 wt % mini hyaluronic acid, 0.5 wt % carboxymethyl cellulose, 0.3 wt % hydroxypropyl methylcellulose (80-120 cp), or 0.1 wt % hydroxypropyl methylcellulose (2600-5600 cp). The packaged contact lenses were then sent to proceed in sterilization process at 121° C. for averaged 20 minutes. All of the results were shown in Table 4 and Table 5.

In Table 4 and Table 5, HA represented hyaluronic acid with molecule weight of about 1000000 Daltons; Mini HA represented mini hyaluronic acid with molecule weight less than about 10000 Daltons; HPMC[a] represented hydroxypropyl methylcellulose with 80-120 cp; HPMC[b] represented hydroxypropyl methylcellulose with 2600-5600 cp; and CMC represented carboxymethyl cellulose with molecule weight of about 250000 Daltons. The lubricity rating is a qualitative ranking scheme where a scale of 0 to 6 is used with 0 or lower numbers indicating worse lubricity. The samples are rinsed with excess DI water for at least three times and then transferred to PBS before the evaluation. Before the evaluation, hands are rinsed with a soap solution, extensively rinsed with DI water and then dried with Kim-Wipe® towels. The lubricity of the hydrogel contact lens without further modification by the functional chemicals was defined for level 2. For consistency, all ratings are independently collected by the same two operators in order to avoid bias and the data so far reveal very good qualitative agreement and consistency in the evaluation.

The functional chemicals working in the process of hydration, sterilization, or combination thereof were applicable in modulation of blue light blocking efficacy (shown in Table 4) and surficial lubricity (shown in Table 5). As shown in Table 4. Generally, besides adding more silver in the reaction solution, the hydrogel contact lenses sterilized in mini HA, HA or HPMC compared to that in borate buffer saline were increased significantly in blue light blocking ranged from about 1% to about 16%.

As shown in Table 5. For all of the resultant contact lenses sterilized in borate buffer saline, HA, HPMC, or CMC, those incubated in 0.3 wt % HPMC (80-120 cp, estimated 26000 Daltons) for additional hydration performed enhanced surficial lubricity level as compared with other conditions. In addition, adding HA and HPMC into the sterilization process were also sufficient to increase the lubricity of all the hydrogel contact lenses that were obtained from different conditions of hydration.

TABLE 4

| Hydration/ Package solution Silver nitrate | Borate buffer saline | | Mini HA | | HA (0.1 wt %) | | HPMCa (0.3 wt %) | | HPMCb (0.1 wt %) | | CMC (0.5 wt %) | |
|---|---|---|---|---|---|---|---|---|---|---|---|---|
| (ppm) | 15 | 22.5 | 15 | 22.5 | 15 | 22.5 | 15 | 22.5 | 15 | 22.5 | 15 | 22.5 |
| H2O | 13.6% | 25.5% | 21.6% | 41.5% | 19.6% | 32.2% | 19.1% | 31.5% | 18.7% | 35.4% | 16.9% | 24.3% |
| HA (0.1 wt %) | 14.3% | 32.2% | 19.6% | 33.8% | 17.2% | 43.7% | 18.2% | 40.1% | 16.2% | 40.6% | 15.4% | 33.1% |
| HPMC$^a$ (0.3 wt %) | 15.5% | 32.4% | 19.0% | 41.1% | 14.5% | 36.6% | 15.0% | 35.0% | 18.0% | 36.8% | 20.9% | 34.0% |
| HPMC$^b$ (0.1 wt %) | 13.8% | 34.2% | 19.4% | 40.9% | 14.0% | 34.0% | 13.7% | 34.2% | 17.8% | 28.6% | 15.3% | 34.2% |
| CMC (0.5 wt %) | 12.0% | 22.7% | 19.2% | 33.6% | N/A | N/A | 11.0% | 22.5% | N/A | N/A | 11.4% | 17.3% |

TABLE 5

| Hydration/ Package solution Silver nitrate | Borate buffer saline | | Mini HA | | HA (0.1 wt %) | | HPMC (0.3 wt %)$^a$ | | HPMC (0.1 wt %)$^b$ | | CMC (0.5 wt %) | |
|---|---|---|---|---|---|---|---|---|---|---|---|---|
| (ppm) | 15 | 22.5 | 15 | 22.5 | 15 | 22.5 | 15 | 22.5 | 15 | 22.5 | 15 | 22.5 |
| H2O | 2-3 | 2-3 | 2-3 | 3-4 | 3-4 | 3-4 | 4-5 | 4-5 | 4 | 4-5 | 3-4 | 2-3 |
| HA (0.1 wt %) | 2-3 | 2-3 | 2-3 | 3-4 | 3-4 | 3-4 | 4-5 | 4-5 | 4-5 | 4-5 | 3-3 | 2-3 |
| HPMC (0.3 wt %)$^a$ | 3-4 | 3-4 | 3-4 | 3-4 | 3-4 | 3-4 | 4-5 | 4-5 | 4-5 | 4-5 | 3-4 | 3-4 |
| HPMC (0.1 wt %)$^b$ | 2-3 | 2-3 | 3-4 | 3-4 | 3 | 3-4 | 4-5 | 4-5 | 4-5 | 4-5 | 3-4 | 3-4 |
| CMC (0.5 wt %) | 2-3 | 2-3 | 2-3 | 3 | N/A | N/A | 4 | 3-4 | N/A | N/A | 3-4 | 2-3 |

Example 9

84 ml of mixture was first prepared by using DI water to dissolve poly(acrylamide-co-acrylic acid) and trisodium citrate under about 3-minute sonication. The final concentration of poly(acrylamide-co-acrylic acid) and trisodium citrate was 0.5 mg/ml and 0.1 M, respectively. Then, a magnetic stir bar was placed into the mixture and stayed stable about 300-400 rpm. Subsequently 126 ml of silver nitrate solution with two different concentrations was slowly added to the mixture. After 15 minutes, 42 ml of 0.1 wt % PVP was then added to the mixture with another 20-minutes stirring. The resultant reaction solutions with final concentration of 15 ppm and 22.5 ppm silver nitrate were obtained.

Dry-released hydrogel contact lens was then immersed in 1.8 ml of as-prepared reaction solutions in containers for 30 minutes. Then, all of the containers were incubated in water steam at 85° C. for 2 hour. After that, all of the contact lenses were washed with DI water twice. The contact lenses were then soaked into incubator 300 s of which the reactive solution was respectively 0.3 wt % HPMC (80-120 cp), and 0.1 wt % HPMC (80-120 cp) with 0.1 wt % PVP at 85° C. for 1 hour through water bath incubation. After that, contact lenses were hydrated in borate buffer saline at 60° C. for 0.5 hour three times and packed with 1 ml of 0.1 wt % mini HA with 0.1 wt % HA, 0.2 wt % mini HA, 0.2 wt % HA, 0.1 wt % HA with 0.5 wt % CMC, 0.1 wt % mini HA with 0.5 wt % CMC and surfactant 9217 or 0.1 wt % HA with 0.5 wt % CMC and surfactant 9217, of which Surfactant 9217 contains 0.1 wt % polyethylene glycol 200, 0.01 wt % tween 80, and 2 wt % 2-(Metharcyloyloxy)ethyl 2-(trimethylammonio)ethyl phosphate-n-butylmethacrylate copolymer.

Surficial properties of control hydrogel contact lens obtained through Example 1 and the commercial product, DAYILIED TOTAL 1 contact lens were listed in Table 6. In Table 6, WBUT referred to water break up time.

TABLE 6

| | Surface properties of contact lens | | | | | |
|---|---|---|---|---|---|---|
| Product | Blue Light blocking (%) | Lubri-city | Advancing Contact angle (degree) | Hysteresis (degree) | WBUT (s) | WBUT (3-min area) |
| Control contact lens | <5% | 2 | 65.2° | 36.3° | 13-46 s | 46.0% |
| DAYILIED TOTAL 1 | <5% | 6 | 30.5° | 1.9° | 27-60 s | 58.2% |

Table 7 summarized the resultant contact lens after various conditions modulated through hydration process or package solution. In Table 7, HA represented hyaluronic acid with molecular weight of about 1000000 Daltons; Mini HA represented Mini hyaluronic acid with molecular weight less than about 10000 Daltons; HPMC represented hydroxypropyl methylcellulose, and CMC represented carboxymethyl cellulose with molecular weight of about 250000 Daltons. BLB represented Blue light blocking efficacy at wavelengths from 380-480 nm. Het. referred to heterogeneous distribution of blue light blocking material on contact lens. WBUT referred to water break up time. The label #represented the package solution with contact lens after sterilization display light yellow. The label * represented one or more than one of the resultant contact lens was unable to show completed water film at the beginning.

After hydration in 0.3 wt % HPMC, the package solution was added by CMC, the resultant contact lens exhibited about 18-37% of blue light blocking efficacy when the

18 lubricity on the resultant contact lens. Overall, this conclusion indicates that the blue light blocking contact lens of the present disclosure considering surface hydrophilicity and wettability was compatible as compared with the commercial products, DAILIES TOTAL 1 contact lens.

TABLE 7

| | Reaction | | | Surface properties of contact lens | | | | |
|---|---|---|---|---|---|---|---|---|
| Package solution | solution Silver nitrate (ppm) | Hydration process 0.3% HPMC | 0.1% HPMC + 0.1% PVP | Light blocking (%) | Advancing Contact angle (degree) | Hystersis (degree) | WBUT (s) | WBUT (3-min area) |
| Borate buffer saline | 15 | ○ | N/A | 18.2% | 42.6° | 9.0° | 2-11 | 50.2% |
| | 22.5 | ○ | N/A | 33.9% | 64.9° | 31.2° | 0-19* | 76.0% |
| 0.1% HA + 0.1% mini HA | 15 | ○ | N/A | 18.2% | 47.9° | 14.4° | 3-31 | 42.5% |
| | 22.5 | ○ | N/A | 37.2% | 34.4° | 0.6° | 0-46* | 15.4% |
| | 15 | N/A | ○ | 8.3% | 48.7° | 15.9° | 4-7 | 20.2% |
| 0.2% mini HA# | 15 | ○ | N/A | Het. | 38.6° | 6.0° | 6-33 | 6.7% |
| | 22.5 | ○ | N/A | Het. | 35.5° | 1.5° | 18-32 | 13.3% |
| | 15 | N/A | ○ | 13.1% | 45.4° | 12.8° | 6-10 | 39.9% |
| 0.2% HA | 15 | ○ | N/A | 22.0% | 36.8° | 2.9° | 4-24 | 12.1% |
| | 22.5 | ○ | N/A | 33.9% | 46.8° | 14.0° | 0-33* | 30.1% |
| 0.1% HA + 0.5% CMC | 15 | ○ | N/A | 11.2% | 35.9° | 2.4° | 7-36 | 25.3% |
| | 22.5 | ○ | N/A | 31.2% | 42.5° | 9.5° | 2-36 | 16.7% |
| 0.1% mini HA + 0.5% CMC | 15 | ○ | N/A | 13.4% | 34.8° | 1.1° | 7-24 s | 5.1% |
| | 22.5 | ○ | N/A | 37.4% | 35.6° | 1.8° | 10-60 | 36.4% |
| Surfactant 9217 | 22.5 | ○ | N/A | 33.3% | 40.5° | 10.3° | 13-33 | 14.3% |
| Surfactant 9217 + 0.1% HA + 0.5% CMC | 22.5 | ○ | N/A | 32.0% | 36.1° | 7.0° | 28-50 | 10.0% | addition concentration of silver nitrate was 15 and 22.5 ppm. However, when the portion of HPMC was replaced with PVP, the blue light blocking efficacy and water retention of resultant contact lens were significantly decreased. This result can be due to cooperative effect between two polymers on dissolution and stabilization in surficial microstructure of contact lens.

Generally, contact lenses hydrated with HPMC showed about 15-35° decrease of advancing contact angle and hysteresis with increased water retention ability (20-55% decrease of water-breakup area after 3 minutes), suggesting the resultant hydrophilic property of contact lens was improved as compared to control contact lens. However, contact lenses packed with borate buffer saline exhibited significantly decrease at the first point of water break-up time. Particularly, for those with 22.5 ppm silver nitrate reaction, over 80% of contact lenses were not able to perform fully completed water film at the beginning of examinations. This was due to increased hydrophobic area distributed on the contact lens when incubating with HPMC at the temperature over transition temperature (e.g. lower critical solution temperature). It was observed that water break-up time and water-breakup area were improved as the addition of moist chemicals, such as HA, mini HA, CMC, and surfactant in package solution was increased gradually, of which the concentration of moist chemicals in package solution was increased to 0.2 wt %, 0.6 wt % and over 1 wt %. Among the selected moist chemicals, relatively small molecules such as mini HA and surfactant 9217 were more effective on covering the hydrophobic part of contact lens, leading to prolong and maintain the water film and surficial Example 10

Figure 9:
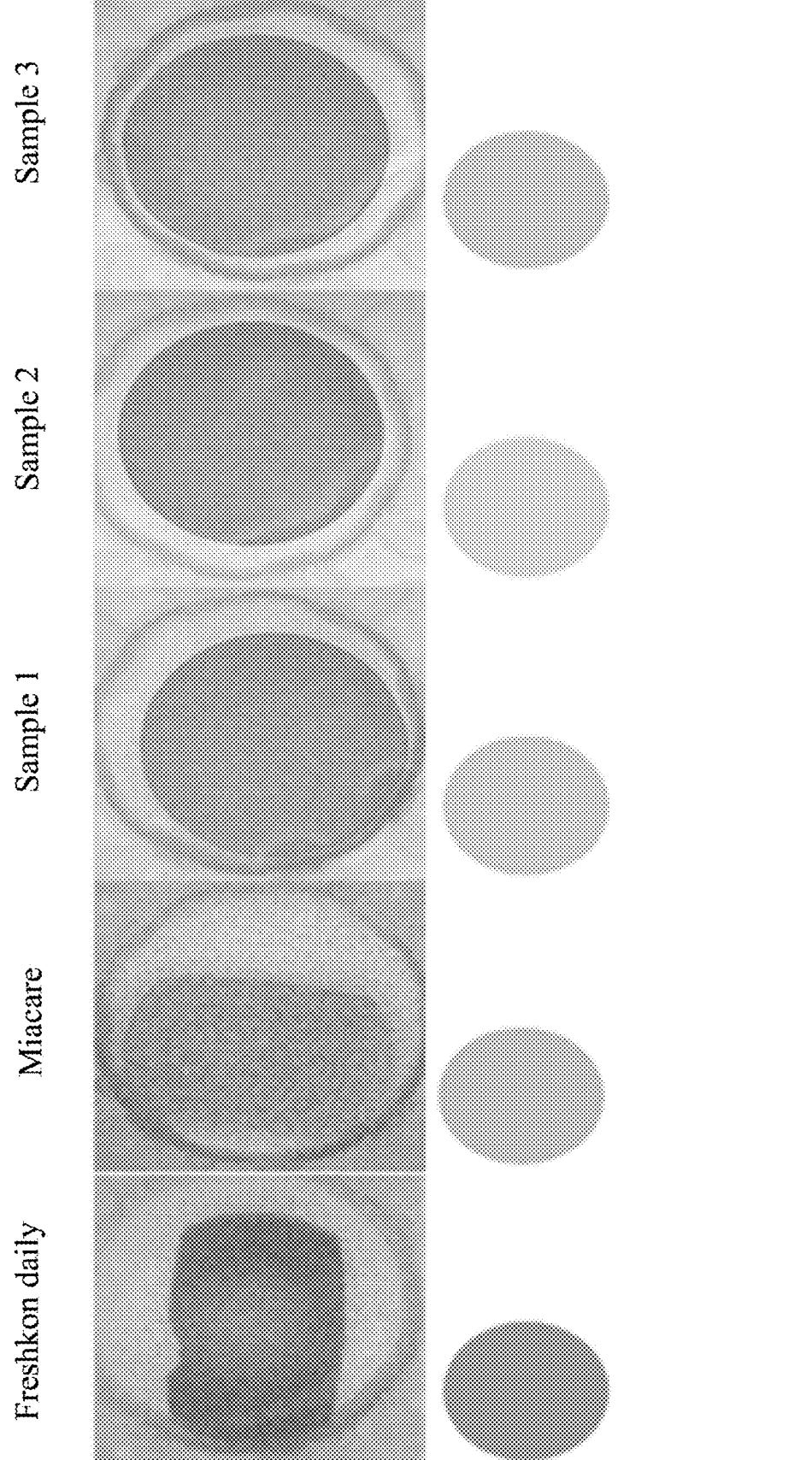

Sample 1, sample 2 and sample 3, which the corresponding package solution was respectively borate buffered saline, surfactant 9217 and surfactant 9217 with 0.5 wt % CIMG and 0.1 wt % HA, were collected from Example 9. Samples 1-3 were recorded through digital camera, and the resultant images were analyzed through processing by an attachment of a palette from computer program or Image J software, as shown in FIG. 9. Then, each of the products was examined regarding to the UV-Vis spectra. Blue-light blocking efficacy was calculated from 380-480 nm. Table 8 summarized the results of the samples 1-3 and the two commercial products.

In Table 8, color yellow (255, 255, 0) was served as the control group for further comparisons of color change ($\Delta C$). All of the samples 1-3 showed overwhelming about 30 to 35% of blue light blocking over the other two commercial products while their color shown in yellow was much less yellowish than that from Miacare with only approximately 14%. Freshkon Daily presented in fluorescent green was not suitable for comparisons in color, but only about 10.6% of blue light blocking was hardly sufficient for eye protection.

TABLE 8

| Sample | Freshkon Daily | Miacare Relux | Sample 1 (Borate buffer saline) | Sample 2 (9217 surfactant) | Sample 3 (9217 surfactant + CMC + HA) |
|---|---|---|---|---|---|
| Blue Light blocking (%) | 10.6% | 14.4% | 33.9° | 33.3° | 32.0% |
| RGB Color | (230, 250, 156) | (251, 241, 147) | (251, 243, 167) | (251, 246, 183) | (249, 239, 169) |
| Color (ΔC) | 252 | 211 | 237 | 260 | 241 |

As described above, according to the embodiments of the present disclosure, a contact lens and a method of manufacturing thereof are provided. The contact lens includes a plurality of blue light blocking material dispersed on contact lens body. The contact lenses of the preset disclosure have good blue light blocking property and exhibit relatively less yellowish appearance compared with commercial contact lenses. In addition, the contact lens of the present disclosure has good surficial hydrophilicity, water retention property along with lubricity.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method of manufacturing a contact lens, comprising:
providing a contact lens body; immersing the contact lens body with a reaction solution to form a contact lens having a blue light blocking material covering the contact lens body, wherein the reaction solution comprises:
a first solvent;
at least one compound comprising a metal ion; and
at least one reducing agent for reducing the metal ion into a metal particle,
preparing a thermal responsive solution, wherein the thermal responsive solution comprises a polymer dissolved in a second solvent;
immersing the contact lens with the thermal responsive solution; and
heating the thermal responsive solution at a temperature equal to or higher than a lower critical solution temperature to form at least one hydrophobic moiety on the contact lens body.

2. The method of claim 1, wherein the first solvent comprises water soluble solvent.

3. The method of claim 1, wherein the metal ion comprises silver ion, gold ion, cobalt ion, manganese ion, nickel ion, copper ion, zinc ion, platinum ion, palladium ion, cadmium ion, indium ion, potassium ion, calcium ion, iron ion, or combinations thereof.

4. The method of claim 1, wherein the reducing agent comprises at least one functional group comprising carboxyl group, amine group, thiol group, sulfide group, aldehyde group, hydroxyl group, alkoxide group, N-heterocycle group, pyrrolidone group, borohydride group, or combinations thereof.

5. The method of claim 1, wherein the reaction solution further comprises at least one hydrophilic-enhanced molecule functionalized with carboxyl group, amine group, thiol group, sulfide group, aldehyde group, hydroxyl group, acrylamide, alkoxide group, N-heterocycle group, pyrrolidone group, ethylene glycol group, or combinations thereof.

6. The method of claim 1, further comprising:
packaging the contact lens with a package solution, wherein the package solution comprises at least one hydrophilic-enhanced molecule; and
performing a sterilization process.

7. The method of claim 1, further comprising performing a heating process at a temperature ranged from 25° C. to 135° C. when immersing the contact lens body with the reaction solution.

8. The method of claim 7, wherein the heating process comprises heating a container accommodating the contact lens body and the reaction solution in an incubator for about 20 minutes to about 24 hours.

9. The method of claim 8, wherein the incubator comprises an oven, an autoclave sterilizer, or a water bath incubator.

10. The method of claim 1, wherein
the thermal responsive solution is prepared at a temperature below a lower critical solution temperature.

11. The method of claim 10, wherein the polymer is functionalized with carboxyl group, amine group, thiol group, sulfide group, aldehyde group, hydroxyl group, acrylamide, alkoxide group, N-heterocycle group, pyrrolidone group, ethylene glycol group, or combinations thereof.

12. The method of claim 10, wherein the at least one hydrophobic moiety consisting of carbon chain with alkane, alkene, or alkyne bonds.

13. The method of claim 12, wherein the carbon chain is a polymer presented in linear or non-linear form comprising branched or cyclic form.

14. The method of claim 10, further comprising:
extracting the contact lens with an extraction solution;
performing a hydration process with a hydration solution; and
performing a sterilization process with a package solution, wherein at least one of the extraction solution, the hydration solution and the package solution comprises at least one hydrophilic-enhanced molecule.

* * * * *